Figure 1:
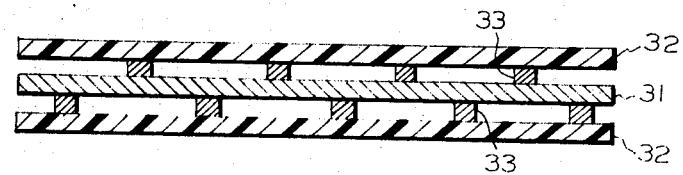

United States Patent
Yoshikawa

[15] 3,655,502
[45] Apr. 11, 1972

[54] HEAT INSULATING LAMINATE

[72] Inventor: Yutaka Yoshikawa, No. 2-24, Hatsudai, Shibuya-ku, Tokyo, Japan

[22] Filed: Dec. 1, 1970

[21] Appl. No.: 93,933

Related U.S. Application Data

[63] Continuation-in-part of Ser. No. 716,471, Mar. 27, 1968, Pat. No. 3,574,109.

[30] Foreign Application Priority Data

May 9, 1967 Japan....................................42/28895

[52] U.S. Cl..............................161/127, 156/85, 156/291, 161/47, 161/129, 161/137, 161/148, 161/402
[51] Int. Cl...................................................B32b 3/28
[58] Field of Search................161/125, 127, 128, 129, 137, 161/147, 148, 139, 47, 402; 52/309; 156/85, 91, 183, 184, 290, 291, 306, 309; 264/342

[56] References Cited

UNITED STATES PATENTS

| | | | |
|---|---|---|---|
| 3,247,927 | 4/1966 | Cragg | 161/129 X |
| 3,414,181 | 12/1968 | Sloan | 161/123 X |

*Primary Examiner*—William A. Powell
*Attorney*—Wenderoth, Lind & Ponack

[57] ABSTRACT

At least one metal foil and at least one thermoplastic resin film are bonded at a number of bonding points uniformly distributed throughout the surface to obtain heat insulating material. The heat insulating material is heated to cause shrinkage of the resin film and wrinkles of the metal foil whereby air spaces between the metal foil and the resin film are formed to obtain heat insulating layer.

4 Claims, 8 Drawing Figures

INVENTOR
YATUKA YOSHIKAWA

INVENTOR
YATUKA YOSHIKAWA

HEAT INSULATING LAMINATE

This application is a continuation-in-part of Ser. No. 716,471 filed on Mar. 27, 1968, now U.S. Pat. No. 3,574,109.

This invention relates to a heat insulating material layer comprising at least one metal foil and at least one thermoplastic resin film bonded each other at a number of scattered bonding points uniformly distributed throughout at least one surface of the film. This invention further relates to a heat insulation layer which is produced by heating the heat insulating material above-mentioned whereby the resin film is tightened and the metal foil is wrinkled to form air spaces between the resin film and the metal foil. The heat insulating material can be easily applied to an object to be heat-insulated and then the material is heated, whereby the heat insulating layer is formed on the object.

Heretofore, the utilization of aluminum foil as a heat insulating material was well-known. Further, it was also known to improve the heat insulating effect by wrinkling the aluminum foil.

All of these conventional methods were based on the idea of combining a high reflecting property to heat radiation at the surface of the aluminum foil and an air layer of a proper thickness on the foil, whereby an excellent heat insulating effect could be obtained. However, these methods of utilizing aluminum foil as the heat insulating layer had various disadvantages.

In this specification and claims, the term "heat insulating material" designates a composite sheet of at least one metal foil and at least one heat-shrinkable thermoplastic resin film bonded with each other at a number of bonding points uniformly distributed throughout the surface of the film, the term "heat insulating layer" designates a composite sheet comprising at least one metal foil and at least one thermoplastic resin film bonded each other at a number of bonding points and the metal foil being wrinkled by subjecting heat treatment to the heat insulating material applied to an object to be insulated, whereby the plastic film is shrunk and tightened while the metal foil is wrinkled, and air spaces are formed between the metal foil and the thermoplastic resin film. An object of the present invention is to provide a heat insulating layer which has a very small thermal conductivity and is very light in weight.

Another object of the present invention is to provide a heat insulating material which is very convenient in handling to form the heat insulating layer.

A still another object of the present invention is to provide a method for forming a heat insulating layer on an object to be heat-insulated which method is very easy in working and is low cost.

The thermoplastic resin films employed in the present invention are previously uniaxially or biaxially oriented thermoplastic resin film, such as polyethylene, polypropylene, polyvinyl chloride, polyvinilidene chloride, polyamide, polyester and acrylic resin. The thickness of resin film varies from 0.01 to 1 mm depending upon practice of a working and an object. A thermoplastic resin film having one or two metallic surfaces may be successfully employed for this invention, in this case the resin film is subjected to vacuum plating treatment in which metals to be deposited on the resin surface include, for example, aluminum, nickel and chromium. Such metallic surface has radiation reflective property, thus the heat insulating effect of the heat insulating material and layer is improved.

The metal foils to be employed in the present invention should be rustproof so that smooth and glossy surface is maintained. Thus, they include aluminum foil, stainless steel foil, steel foil which is plated, diffused or vacuum coated with nickel, chromium or aluminum, bronze foil and phosphor bronze foil. Of among, ordinary, aluminum foil is preferred, because it is cheap in cost and easy in handling. Therefore, for simplification, hereinafter the specification is referred to aluminum foil, however, it should be understood that other metal foil can be used.

In the present invention, the scattered bondings of the aluminum foil and the resin film can be made either by using an ordinal bonding agent or by heat bonding such as spot fusion. The purpose of such bonding is to cause the wrinkles in the aluminum foil by a shrinkage of the thermoplastic film on heating while the aluminum foil being restrained at the bonding points. As shown later in the drawings, in case aluminum foils are bonded to both surfaces of a thermoplastic resin film, the bonding points on the both surfaces may either coincide or deviate with each other, but in case two thermoplastic resin films are bonded to both surfaces of an aluminum foil, the bonding points on the both surfaces should be deviated from each other. The distance between the bonding points is generally from 10 to 50 mm and preferably 20 to 40 mm.

In general, the heat insulating layer according to this invention, there can be enumerated such many advantages that:

1. Upon shrinking the thermoplastic resin film, the aluminum foil be wrinkled;
2. The thermoplastic resin film serves to hold the aluminum foil in its wrinkled form;
3. The thermoplastic resin film prevents the break of the aluminum foil;
4. The thermoplastic resin film prevents the deformation of the wrinkles of the aluminum foil;
5. The thermoplastic resin film prevents the wrinkles of the aluminum foil from thrusting into the next layer, when a plurality of the heat insulation layers are formed in overlaid relationship;
6. The thermoplastic resin film prevents the deposition of dust on the aluminum foil, thereby the corrosion of the aluminum foil be avoided;
7. The thermoplastic film protects the aluminum foil to impart resistance to an acid, alkali and salt;
8. The heat conduction due to the contact of the aluminum foils each other is made so low that dewing can also be prevented;
9. The heat insulating effect of the boundary layer air on the thermoplastic film surface can be added;
10. The fitting work can easily be performed without touching the aluminum foil to the object, when fixing the heat insulating material to any object by facing the thermoplastic resin film surface, thereby the heat conduction is reduced;
11. It is possible to fix the heat insulating material to a curved surface or irregular surface of an object, such as duct, and to wind it round a duct or the like;
12. The heat insulating material of the present invention can freely be transported in the form of a composite sheet to any place, where the heat insulating material is used for fixing it to any object to be heat-insulated, and then heating it to cause wrinkles of the foil in the material whereby the heat insulating layer is formed; and
13. It is possible to make a prefabricated article as an assembly member by combining, for instance, the heat insulating material and corrugated plate.

The heat insulating material according to the present invention can be supplied in a roll form of a long sheet. As the spot, bonding of the aluminum foil and thermoplastic resin film can be made by means of a printing an adhesive on surface either of the foil or resin and combining the both, or by means of a spot high frequency fusion of the film overlaid on the foil. Thus the mass production of the heat insulating material is possible.

Figure 2:
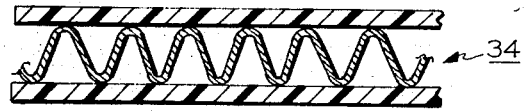

FIG. 1 shows the heat insulating material according to the present invention comprising one aluminum foil and two heat shrinkable thermoplastic films. The resin films 32 are bonded on the both surfaces of the aluminum foil 31 at a number of points 33 throughout the surfaces of the foil in regular intermitted distances by adhesive or spot fusion of the resin. Upon shrinking the resin films a number of wrinkles of the aluminum foils 34 (FIG. 2) are resulted. The bonding points in the both surfaces should be deviated with each other. In this case the aluminum foil is intermediate layer between the resin films, so, when a plurality of the heat insulating materials are used, aluminum foils which are heat conductive materials do not contact each other, and the heat insulating effect is improved.

Figure 3:
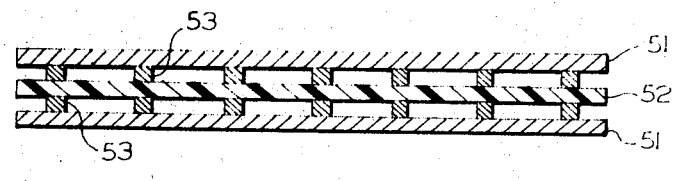
Figure 4:
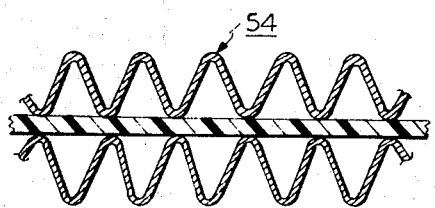

FIG. 3 shows another heat insulating material according to the present invention comprising one heat shrinkable thermoplastic film and two aluminum foils. The aluminum foils 51 and 51 are bonded to the both surfaces of the resin film 52 at a number of points throughout the surfaces in regular intermitted distances. The bonding points on the both surfaces may or may not be deviated from each other. As the shrinkage of the resin films is made, a number of wrinkles 54 (FIG. 4) are resulted on the aluminum foils.

Figure 5:
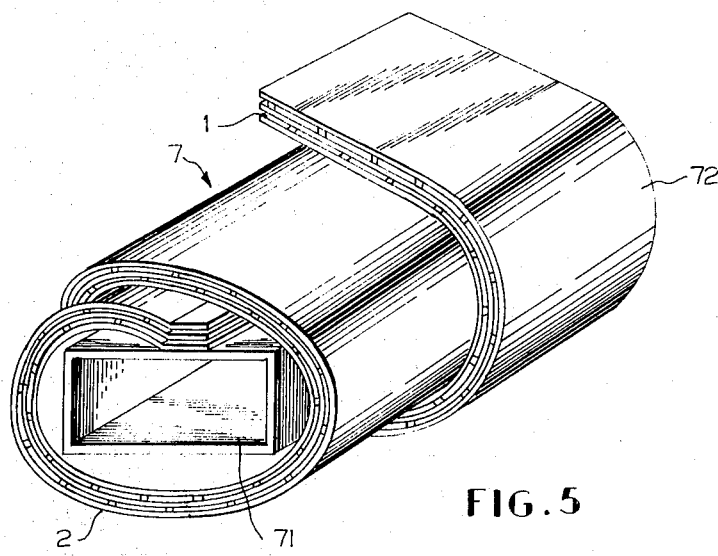
Figure 6:
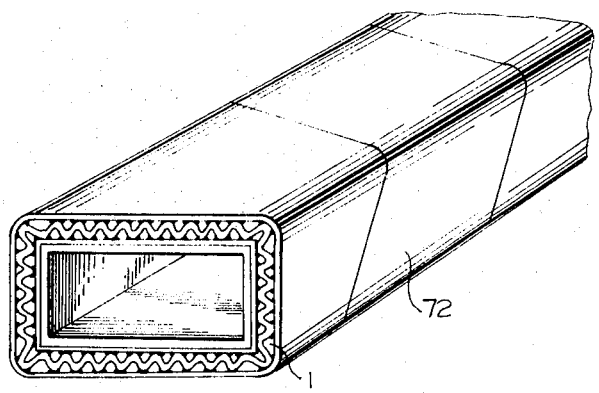

FIGS. 5 – 8 show the embodiments applied the heat insulating layer to various objects. In FIG. 5, an air duct 71 is employed, and it is loosely and spirally wound around with the heat insulating material 72, the material is wound around the duct in single- or multi-layers in the form of partially overlapping the each edge of the material. If desired, the heat insulating material is fixed to the duct by means of nail, ribbet or staple in appropriate portions, preferably the ends of duct. Then the heat insulating material is heated to cause shrinkage of the resin film thereby wrinkles of the foil (FIG. 6) are obtained and the heat insulating layer is formed on the duct tightly. Further, if desired, before or after forming the heat insulating layer, the duct can be covered with any other insulating material such as glass fiber, asbestos, rock wool and sheet thereof.

Figure 7:
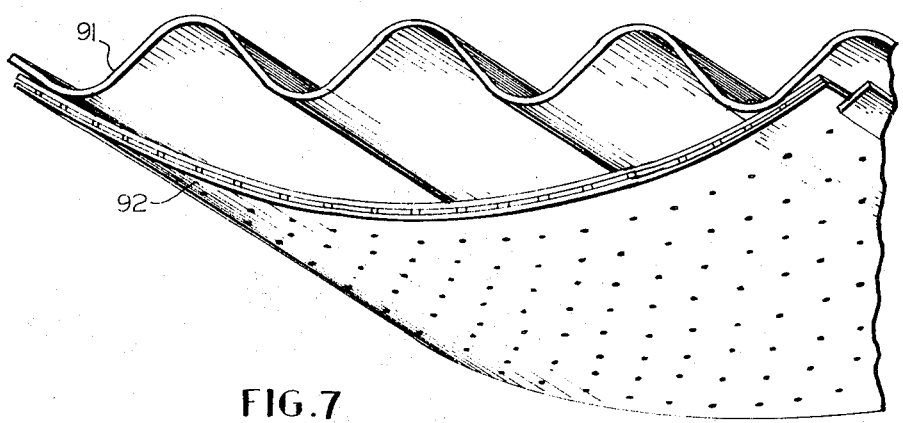
Figure 8:
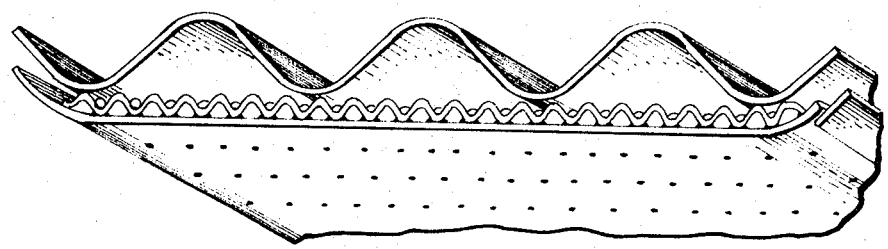

FIGS. 7 and 8 show a combination of the heat insulating material and corrugated plate. The corrugated plate 91 and the heat insulating material 92 is combined by adhesive tape in the ends of the plate. The length of the heat insulating material must be sufficient to permit shrink, upon heating, to tightly contact with ridges of the corrugated plate. After shrinking of the resin film in the heat insulating material the wrinkles of the foil are obtained. The typical applications of the heat insulating material are explained referring to the duct and corrugated sheet, it should be noted that the heat insulating material can equally be applied to inside of wall, roof and floor and then, upon heating it, the heat insulating layer is obtained.

What is claimed is:

1. A heat insulating material comprising one metal foil and two heat-shrinkable thermoplastic resin films characterized by the resin films being bonded to both surfaces of the metal foil at a number of bonding points uniformly and deviatively distributed throughout the surfaces of the metal foil.

2. A heat insulating layer comprising one aluminum foil and two thermoplastic resin films and the resin films being bonded to both surfaces of the metal foil at a number of bonding points uniformly and deviatively distributed throughout the surfaces of the metal foil characterized by the resin films being tightened and the metal foil being wrinkled to form a number of spaces between the resin films.

3. A heat insulating material comprising one heat-shrinkable thermoplastic resin film and two metal foils characterized by the metal foils being bonded to both surfaces of the resin film at a number of bonding points uniformly distributed throughout the both surfaces of the resin film.

4. A heat insulating layer comprising one thermoplastic resin film and two metal foils and the metal foils being bonded to both surfaces of the resin film at a number of bonding points uniformly distributed throughout the surfaces of the resin film characterized by the resin film being tightened and each metal foil being raised and wrinkled between the bonding points.

* * * * *